Dec. 2, 1930.  J. L. DOSS  1,783,872
TIRE CHAIN
Filed July 30, 1929
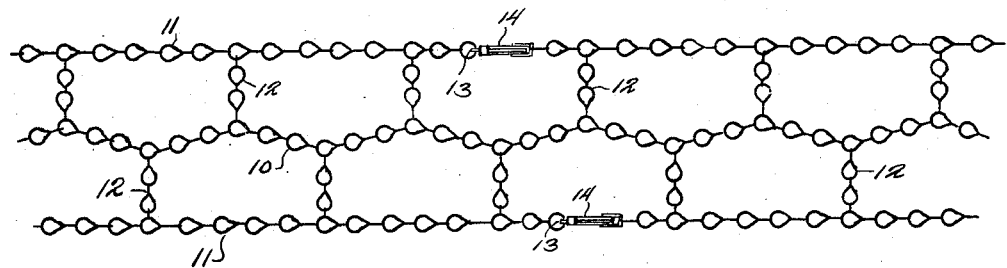
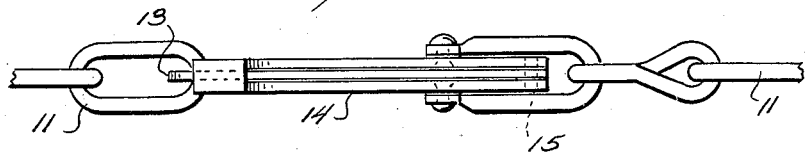
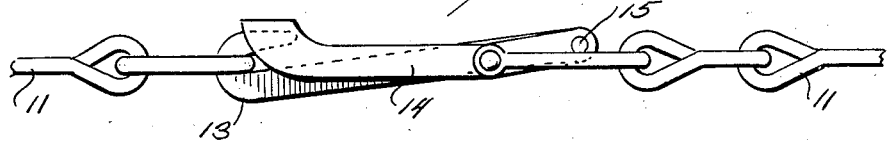
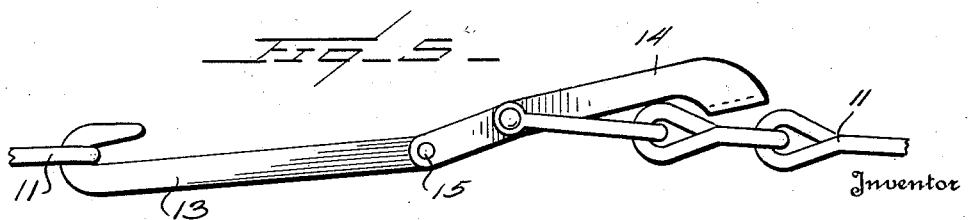
Inventor
J. L. Doss
By Watson E. Coleman
Attorney Patented Dec. 2, 1930

1,783,872

UNITED STATES PATENT OFFICE

JESSE LEE DOSS, OF EVANSTON, WYOMING, ASSIGNOR OF FORTY-EIGHT PER CENT TO G. A. DE FREECE, OF MIDWEST, WYOMING

TIRE CHAIN

Application filed July 30, 1929. Serial No. 382,172.

This invention relates to improvements in automobile tire chains in which a plurality of longitudinally extending chains are used connected together by cross chains and the general object of the present invention is to provide a structure of this character which is provided with a middle or tread chain, side chains, and straight cross chains connecting the tread chain to the side chains whereby to secure better traction and reduce side skidding to a minimum and yet provide a chain which will run smoothly over hard surfaced roads.

A further object is to provide a chain of this character which can be used with any make of car, that will reduce accidents and provide for long service.

Other objects will appear in the course of the following description.

My invention is illustrated in the accompanying drawings, wherein:—

Figure 1 is a fragmentary plan view of a tire chain constructed in accordance with my invention;

Figure 2 is an enlarged top plan view of the fastener used for one of the side chains;

Figure 3 is a side elevation of the fastener;

Figure 4 is a longitudinal sectional view of the construction shown in Figures 2 and 3;

Figure 5 is a view of the fastener open.

Referring to the drawings, 10 designates the tread chain which is medially disposed and endless. This chain will be made to fit different sizes of standard tires. Disposed on each side of the middle chain are the side chains 11 which are connected to the middle or tread chain by means of the cross chains 12. These cross chains, as illustrated in Figure 1, are disposed in staggered relation with regard to each other so that a cross chain extending from one side chain will intersect and connect with the tread chain at a point approximately midway between two cross chains extending from the tread chain to the other side chain. This is an important feature of my invention that this cross chain should be staggered. These chains are, of course, to be made of metal and the links of the chain may have any suitable configuration to cause them to secure proper traction to the road without undue wear to the tire.

The side chains are provided with means whereby slack may be taken up at one or more points, this means consisting of one or more hooks 13 disposed in a length of a chain 11 and connected with one of the links of the chain, this hook having pivoted thereto a latch 14 formed of an approximately U-shaped piece of metal embracing the end of the hook 3 and pivoted thereto at 15. Outward of this pivot point, the other stretch of the chain is connected to the lever 14 so that when this lever is forced into a practically parallel relation to the hook 13, the two ends of the chain will be pulled toward each other. When the hook 13 is hooked into the closed end of the chain, the lever is pulled over it and the riveted ends of the lever and hook at 15 pass through the link of the chain that is riveted to the lever 14 so that the strain will be carried along the longitudinal axis of both the hook and the lever 14 and tend to cause the hook to swing to a closed position after it has passed its center.

The free end of the lever 14 when it is closed extends under the hook end of the member 13, thus locking this lever so that it will not become unfastened until the free end of the lever is sprung out from under the hook of the member 13. The middle chain is to be sufficiently long so that the diameter of this middle chain will be somewhat greater than the diameter of the tire to which it is to be applied so that when the side chains are engaged on each side of the tire and these side chains contracted, the middle chain will be pulled into a slightly zig-zag position by the strain on the cross chains and all slack in the middle chain will be taken up thereby.

It will be seen that the middle or tread chain is of solid construction in that there are no hooks or other means in the length of this chain, but that the chain is endless. The side chains are of the conventional type as are the cross chains. A tire chain constructed in accordance with my invention will hold the car from side skidding and when placed on the front wheel will afford sufficient traction to enable the driver to pull out of slippery tracks, etc., as well as keep the car from skidding into the ditch. Actual tests have shown that this tire chain will give at least 50% better traction on a straight hill pull than the conventional type, since there is very little slippage due to the fact that there are parts of the chain in contact with the road at all times. Thus my improved tread chain which has been drawn into zig-zag relation by the lateral chains when the side chains are hooked up, resists any lateral skidding action and at the same time secures traction at the point where it is most needed, namely at the middle of the tire tread.

I claim:—

A tire chain comprising an endless tread chain adapted to be loosely positioned on the tread of the tire, a pair of split side chains, a plurality of cross chains secured to said side chains and terminating at said endless chain, said cross chains being disposed in staggered relation to each other, and tensioning means carried by one end of each of said side chains and engageable in selected links in the opposite end of each side chain whereby to tighten the side chains, said cross chains upon tightening of the side chains being adapted to dispose the endless chain in staggered relation across the tread of the tire.

In testimony whereof I hereunto affix my signature.

JESSE L. DOSS.